Feb. 8, 1927. 1,617,168
C. SCHRAMM
RELIEVING MECHANISM
Filed Feb. 8, 1924 2 Sheets-Sheet 1
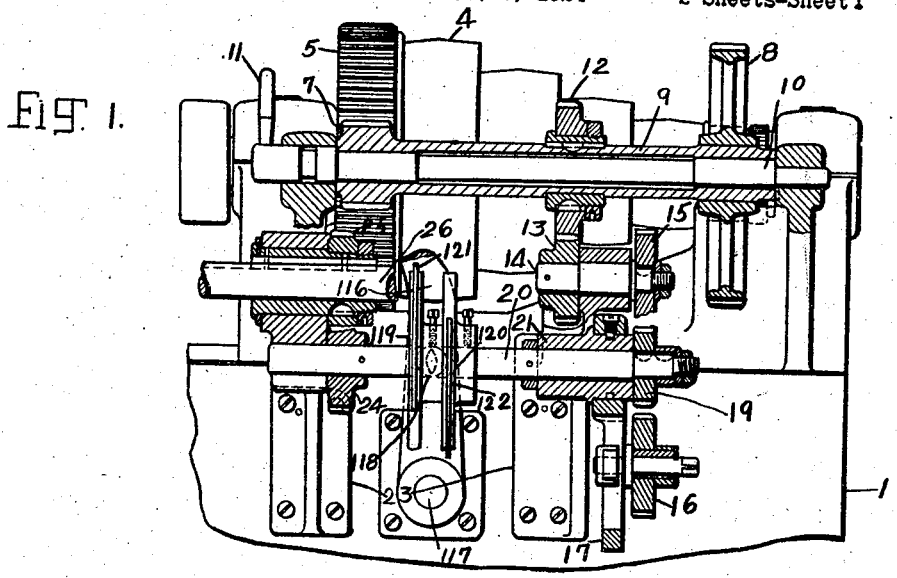
Fig. 1.
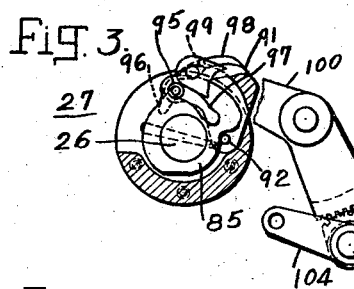
Fig. 3.
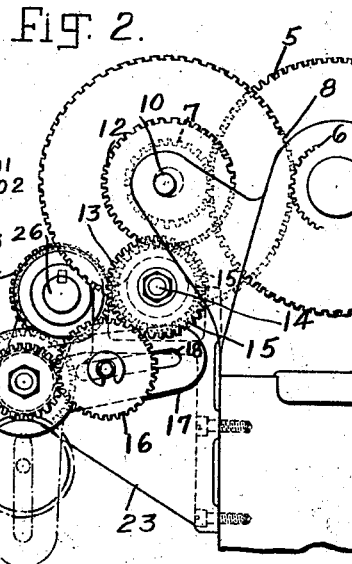
Fig. 2.
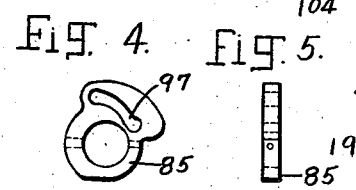
Fig. 4. Fig. 5.
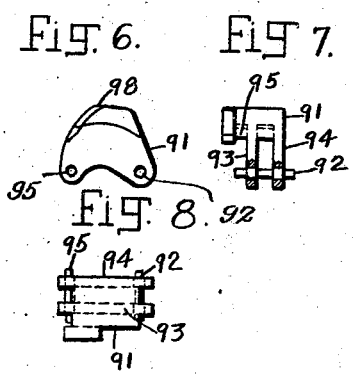
Fig. 6. Fig. 7.
Fig. 8.
INVENTOR.
Carl Schramm.
BY Wayne B Wells.
ATTORNEY

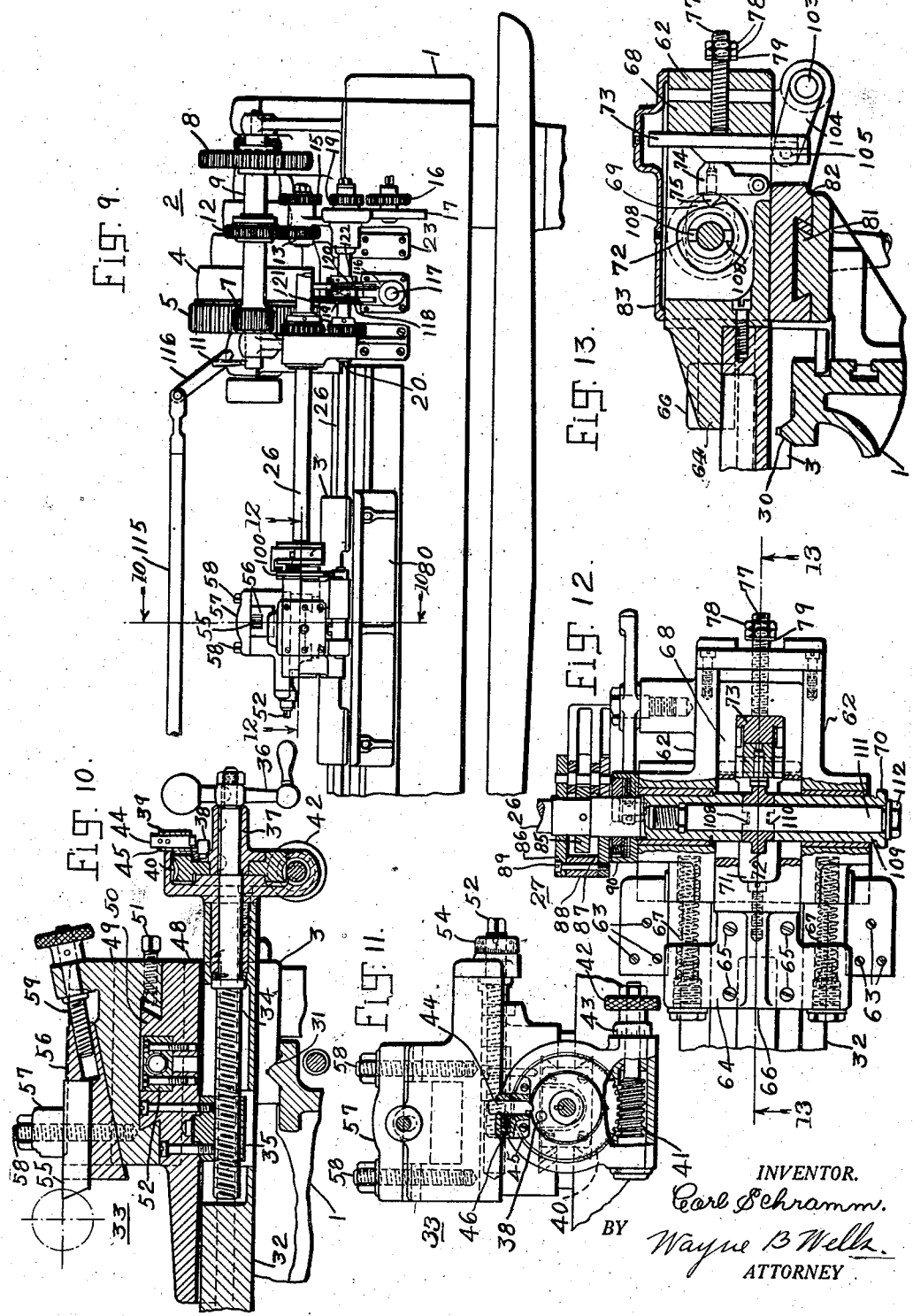

Patented Feb. 8, 1927.

1,617,168

UNITED STATES PATENT OFFICE.

CARL SCHRAMM, OF WEST HARTFORD, CONNECTICUT, ASSIGNOR TO PRATT & WHITNEY COMPANY, OF NEW YORK, N. Y., A CORPORATION OF NEW JERSEY.

RELIEVING MECHANISM.

Application filed February 8, 1924. Serial No. 691,399.

My invention relates to lathes and particularly to relieving mechanisms for lathes.

One object of my invention is to provide a relieving mechanism for a lathe that shall control the relieving movements in a new and improved manner and in accordance with the direction of rotation of the lathe spindle.

Another object of my invention is to provide a relieving mechanism for a lathe that shall operate a cutting tool to effect relieving movements when the lathe spindle is rotated in one direction and that shall automatically withdraw the tool from engagement with the work and stop the relieving movements when the direction of rotation of the lathe spindle is reversed.

A further object of my invention is to provide a relieving mechanism for a lathe that shall have a cam mechanism for moving a cutting tool into engagement with the work and effect relieving movements when the lathe spindle is rotated in one direction and that shall withdraw the cutting tool from engagement with the work and stop the relieving movements when the direction of the spindle rotation is reversed.

In a great number of the relieving lathes now in service, it is necessary to manually stop the relieving movements and withdraw the cutting tool from engagement with the work when the rotation of the lathe spindle is reversed. In some cases, the relieving movements are stopped when the direction of rotation of the lathe spindle is reversed but no means is provided for automatically withdrawing the tool from engagement with the work when the spindle rotation is reversed.

In a relieving mechanism constructed in accordance with my invention, a cam mechanism is provided which is operated in accordance with the direction of rotation of the lathe spindle. When the lathe spindle is rotated in one direction, the cutting tool is moved into engagement with the work and relieving movements are effected in timed relation to the blank rotation. When the direction of rotation of the lathe spindle is reversed, the cutting tool is automatically withdrawn from engagement with the work and the relieving movements are stopped. The relieving mechanism is also provided with means for preventing changing the direction of rotation of the lathe spindle except when the cam mechanism for controlling the relieving movements is in a predetermined position.

In the accompanying drawings:

Figure 1 is an elevational view, partially in section, of the headstock of a lathe provided with a relieving attachment constructed in accordance with my invention.

Fig. 2 is a partial end elevational view of the headstock shown in Fig. 1.

Fig. 3 is a view illustrating the cam mechanism for controlling the relieving movements.

Figs. 4 and 5 are detail views of the latch cam member shown in Fig. 3.

Figs. 6, 7 and 8 are detail views of the latch member shown in Fig. 3.

Fig. 9 is a partial side elevational view of a lathe having a relieving attachment embodying my invention.

Fig. 10 is a sectional view along the line 10—10 of Fig. 9.

Fig. 11 is an end view of the tool slide.

Fig. 12 is a view partially in section along the line 12—12 of Fig. 9.

Fig. 13 is a section along the line 13—13 of Fig. 12.

Referring to the drawings, a lathe is illustrated having a frame 1 upon which is mounted a headstock 2, a carriage 3, and a tailstock (not shown). The headstock 2 comprises the usual set of cone pulleys 4, a gear wheel 5 and a pinion 6. The gear wheel 5 meshes with a pinion 7 and the pinion 6 meshes with a gear wheel 8. The pinion 7 and the gear wheel 8 are mounted on a shaft 9 and comprises the usual back gearing. The shaft 9, which is tubular in form, is mounted on a rod 10 which is eccentrically supported on the frame of the headstock. When the rod 10 is rotated by a handle 11, the pinion 7 and the gear wheel 8 are, in the usual manner, moved into and out of engagement, respectively, with the gear wheel 5 and the pinion 6.

The shaft 9 carries a gear wheel 12 which meshes with a gear wheel 13. The gear wheel 13 is mounted on a short shaft 14 which carries a second gear wheel 15. The gear wheel 15 meshes with a gear wheel 16 which is supported on a swinging arm 17. The gear wheel 16 is supported by a bolt which is fitted to a slot 18 formed in the arm 17. The gear wheel 16 meshes with a gear wheel 19 which is mounted on a shaft 20, The arm 17 is rotatable on a bearing 21 which is supported on the shaft 20. The sizes of the gear wheels 15, 16 and 19 may be varied in accordance with the work being operated on. In Fig. 2 of the drawings, the arm 17 is shown in a raised position in order to connect the gear wheels 15 and 16. In Fig. 1 of the drawings, the arm 17 is shown in its lowermost position, as indicated in dotted lines in Fig. 2, in order to more clearly show the relation of the various gear wheels. The shaft 20 and the short shaft 14 are mounted on a bracket 23 which is suitably attached to the side of the lathe. The shaft 20 carries another gear wheel 24 which meshes with a gear wheel 25 on a cam shaft 26. The cam shaft 26 carries a cam mechanism 27 and controls the relieving movements in a manner to be hereinafter described.

The carriage 3 is mounted on suitable ways 30 and 31 formed on the frame 1 of the lathe. The carriage 3 supports a relieving slide 32 which is operated to effect relieving movements by the cutting tool. A tool head 33, shown in Figs. 10 and 11 of the drawings, is supported on the slide 32 and is adapted to be moved along such slide by means of a screw shaft 34. The screw shaft 34, which is mounted on the relieving slide 32, is connected to the tool head 33 by means of a nut 35 and is operated by a handle 36.

A bushing 37, which is keyed to the screw shaft 34, carries a pin 38. The pin 38 is adapted to engage a suitable stop mechanism 39 to limit the movement of the screw shaft. The stop mechanism 39 is adjustable and is mounted on a worm gear 40. The worm gear 40 is rotatable on the bushing 37 and is operated by a worm member 41 under the control of a thumb member 42. Suitable graduations 43 may be formed on the member 42 for indicating the amount of movement of the tool head along the slide 32. The stop mechanism 39 comprises a pin 44 which is movable in a bracket 45. The bracket 45 is suitably secured to the worm wheel 40. The pin 44, which is movable in the bracket 45 into and out of operative relation to the pin 38 on the bushing 37, is held in either position by a suitable detent 46. Thus, when it is desired to change the position of the cutting tool, the position of the stop mechanism is varied by means of the thumb member 42. The screw shaft 34 is operated until the pin 38 engages the pin 44.

The tool head 33 comprises a slide 48 which is movable along the relieving slide 32, as heretofore set forth, and a tool slide 49. The tool slide is movable transversely across the slide 48 on ways 50. A suitable bolt 51 is provided for locking the tool slide 49 in any set position. A screw shaft 52, which is mounted on the tool slide 49, is connected with the slide 48 by means of a suitable nut 53. A collar member 54 having suitable graduations formed thereon is mounted on the screw shaft 52 in order to indicate the amount of transverse movement of the tool slide 49 across the slide 48.

The tool slide 49 carries a cutting tool 55 which is supported between a wedge member 56 and a bar 57. The bar 57 is secured to the slide 49 by suitable bolts 58. The wedge member 56 is operated by a screw 59 for moving the cutting tool firmly into engagement with the bar. It will be noted that by means of such structure, the cutting tool may be set on center or off center of the work being operated on.

Referring to Figs. 9, 12 and 13 of the drawings, the relieving mechanism comprises a frame 62 which is suitably mounted on the carriage 3 and which is connected thereto by means of bolts 63. A reciprocating member 64, which is attached to the relieving slide 32 by means of screws 65, projects into the frame 62. The reciprocating member 64 is provided with a head portion 66 and an elongated portion 68 which projects into the frame 62. Between the head portion 66 and the frame 62 are disposed two spring members 67. The spring members 67 exert a force tending to move the relieving slide so as to hold the cutting tool out of engagement with the work. The portion 68 of the member 64 is provided with elliptical openings 69, as shown in Fig. 13, for permitting the cam shaft 26 to pass therethrough. An opening 71 is formed in the central portion of the extension 68 not only for containing a relieving cam 72 but also for containing a wedge member 73 and a dog 74. The dog 74 is pivotally mounted on the frame 62, as shown in Fig. 13 of the drawings, and carries a pin 75 which engages the cam member 72. The wedge member 73 is interposed between the dog 74 and the extended portion 68 of the reciprocating member 64. When the wedge member 73 is in the raised position, as shown in Fig. 13 of the drawings, the movement of the cam member 72 is transmitted to the reciprocating member 64 and to the relieving slide. However, when the wedge member 73 is in its lowermost position, it is moved out of engagement with the dog 74 and accordingly the movement of the relieving cam is not transmitted to the relieving slide. The lowering of the wedge member 73 not only stops any relieving movement by the relieving slide but also permits the springs 67 to move the relieving slide so as to withdraw the cutting tool from engagement with the work. The movement of the relieving slide by the springs 67 is limited by means of a bolt 77 having nuts 78 thereon. The bolt 77 is attached to the reciprocating member 64 and a leather washer 79 is preferably disposed adjacent the nuts 78 for engaging the frame 62 to limit the movement of the reciprocating member by the spring members 67.

A bracket 80, which is mounted on the frame 1 of the lathe, carries a guideway 81. A slide 82 which is movable along the guideway 81 supports the frame 62. A suitable cover 83 is mounted on top of the frame 62 for protecting the cam member 72 and the parts associated therewith.

The cam mechanism 27 comprises a latch cam 85 which is keyed to the cam shaft 26 in order to rotate with the relieving cam 72. The latch cam 85 is mounted on the cam shaft 26 between two latch cam plates 86 and 87. The latch cam plates are separated by a spacing member 88 and are suitably held together by means of screws 89. The latch cam plates are rotatably mounted on the cam shaft 26 and the plate 87 is engaged by a frictional device 90 which is supported on the side of the frame 62. The frictional device may be of any suitable type and acts as a brake on the latch cam plates and the parts attached thereto in order to oppose the movement of the cam shaft 26.

A latch member 91, which is shown in Figs. 6, 7 and 8 of the drawings, is pivotally supported on the latch cam plates 86 and 87 by means of a pin 92. The pin 92 extends through two projecting arms 93 and 94 on the latch member. The projecting arms 93 and 94 are disposed on opposite sides of the latch cam 85. The latch member carries a cam pin 95 which extends through slots 96 formed in the latch cam plates 86 and 87 and a cam slot 97 formed in the latch cam 85. The latch member 91 carries a latch 98 which is adapted to engage a member 99 which is mounted on a bell crank lever 100. The bell crank lever 100 has gear teeth 101 formed in one end thereof which mesh with a gear segment 102. The gear segment 102 is mounted on a shaft 103 which carries a lever 104. The lever 104 carries a block 105 which controls the movement of the wedge member 73. The block 105 is pivotally mounted on the lever 104 and projects into an opening in the wedge member 73. The lever 104 and the block 105 serve to raise and lower the wedge member and still permit the wedge member to follow the reciprocating movements of the relieving slide.

Assuming the cam shaft 26 to be rotating in a clockwise direction, as shown in Fig. 3 of the drawings, the cam slot 97 in the latch cam 85 will move the cam pin 95 to one extreme end of the slot 96 in the latch cam plate. In such position of the latch member 91, the latch 98 will be moved to its extreme position away from the cam shaft 26. The latch 98 during its revolution will engage the member 99 on the bell crank lever to move such lever to the position shown in Fig. 3 of the drawings. The bell crank lever in such position operates the gear segment 102, the arm 104 and the block 105 to raise the wedge member 73. The wedge member in its raised position, as heretofore set forth, moves the cutting tool into engagement with the work and transmits the movement of the relieving cam 72 to effect relieving movements by the slide 32.

If the rotation of the lathe spindle is reversed to reverse the direction of rotation of the cam shaft 26, the cam slot 97 draws the cam pin 95 towards the axis of rotation. The pin is accordingly moved to the opposite end of the slots 96 from that shown in Fig. 3 of the drawings. Such movement of the latch cam pin moves the latch 98 towards the axis of rotation. The counterclockwise rotation of the cam mechanism causes the latch 98 to engage the member 99 and give the bell crank lever 100 a movement of rotation in a clockwise direction. Such movement of the bell crank lever 100 operates the shaft 103 and the arm 104 in a counterclockwise direction to lower the wedge member 73. The lowering of the wedge member 73, as heretofore set forth, permits the spring members 67 to withdraw the tool from engagement with the work and stops the transmission of the movement of the relieving cam 72 to the relieving slide. From the above description, it is apparent when the lathe is operated in one direction, the tool is moved into engagement with the work and relieving movements are effected thereby and when the lathe is operated in a reverse direction the tool is withdrawn from engagement with the work and no relieving movements are effected.

The shaft 26 is provided with end portions 108 which project into slots formed in the relieving cam 72. A tubular shaft 109 which is aligned with the cam shaft 26 is provided with similar projections 110 which project into the relieving cam 72. A rod 111, which projects through the shaft 109 and the relieving cam 72, is threadably secured to the relieving shaft 26, as indicated in Fig. 12 of the drawings. The rod 111 is provided with a head 112 which holds the shaft 109 and the relieving cam 72 in position. The relieving cam is quickly changed by withdrawing the shaft 111.

No means has been described for effecting longitudinal movement of the carriage along the ways in timed relation to the lathe spindle rotation. However, it is to be understood that a lead screw 114 may be operated in any suitable manner to effect longitudinal feeding movements by the carriage.

In order to effect automatic operation of the bell crank lever 100, to start or stop the relieving movements, it is essential that no change in the direction of rotation of the cam shaft and of the lathe spindle be effected when the latch 98 is near engagement with the member 99 on the bell crank lever 100. The arm 115, which controls the source of power connected to the set of cone pulleys 4, is connected to a lever 116. The lever 116 is pivotally mounted at 117, as shown in Figs. 1 and 9 of the drawings. The movement of the arm 115 towards the right, as shown in Fig. 9 of the drawings, operates the lathe in a forward direction and also effects relieving movement. The movement of the arm 115 towards the left, as shown in Fig. 9 of the drawings, reverses the direction of rotation of the lathe and no relieving movements are effected. In the position shown in Fig. 9 of the drawings, the arm 115 and the lever 116 are shown in neutral position and at which time the rotation of the lathe is stopped. The lever 116 carries a pin 118 which is shown in Figs. 1 and 9 of the drawings in position between two disks 119 and 120. The two disks 119 and 120 are respectively provided with rim portions 121 and 122 which extend into the path of movement of the pin 118 to control the reversing of the rotation of the lathe spindle. Such projecting rims 121 and 122 extend only partially around each of the disks so as to permit the movement of the lever 116 when the cam mechanism is in a predetermined position. The rim members permit the reversing of the direction of rotation of the lathe spindle when the cam mechanism 27 is in suitable position for stopping or starting the relieving movements.

It will be understood that such changes and modifications may be made in my invention as fall within the limits of the appended claims.

What I claim is:

1. In a relieving mechanism, the combination with a cam member rotatable in a forward and in a reverse direction and a relieving slide adapted to be operated by said cam member, of a wedge member interposed between said cam member and the relieving slide, and means for withdrawing said wedge member from operative position upon reversal in the direction of rotation of the cam member.

2. In a relieving mechanism, the combination with a cam member rotatable in a forward and in a reverse direction and a relieving slide adapted to be operated by said cam member, of a wedge member for operatively connecting said cam member to the relieving slide to effect relieving movements, and means for moving said wedge member into operative relation to the cam member in accordance with the direction of rotation of the cam member.

3. In a relieving mechanism, the combination with a cam shaft, a relieving cam member mounted on said cam shaft, and a relieving slide adapted to be operated by said cam member, of a cam mechanism mounted on said shaft and operated in accordance with the direction of rotation of the shaft, and means operated by said cam mechanism for connecting said cam member to the relieving slide to effect relieving movements when the cam shaft is rotated in one direction and for stopping the relieving movements and moving the tool away from the work when the cam member is rotated in an opposite direction.

4. In a relieving mechanism, the combination with a cam shaft, a relieving cam member mounted on said cam shaft, and a relieving slide adapted to be operated by said cam member, of a cam mechanism mounted on said shaft and operated in accordance with the direction of rotation of the shaft, and a wedge member operated by said cam mechanism for connecting said cam member to the relieving slide to effect relieving movements when the cam shaft is rotated in one direction and for stopping the relieving movements and moving the tool away from the work when the cam member is rotated in an opposite direction.

5. In a relieving mechanism for a lathe, the combination with a tool slide, a relieving slide for supporting the tool slide, and a longitudinally movable carriage for supporting the relieving slide, of a cam member rotated in accordance with the movement of the lathe spindle for effecting relieving movements by the relieving slide, and means comprising a wedge member operated in accordance with the direction of rotation of the cam member for preventing relieving movements by the relieving slide when the carriage is being returned to initial position.

6. In a relieving mechanism for a lathe, the combination with a tool slide, a relieving slide for supporting the tool slide, and a longitudinally movable carriage for supporting the relieving slide, of a cam member rotated in accordance with the movement of the lathe spindle for effecting relieving movements by the relieving slide, a cam mechanism operated in accordance with the direction of rotation of the cam member, and a wedge member operated by said cam mechanism for preventing relieving movements by the relieving slide when the carriage is being returned to initial position.

7. In a relieving mechanism for a lathe, a longitudinally movable carriage, a transversely movable relieving slide mounted on the said carriage, and a tool slide mounted on said relieving slide, of a cam shaft rotated in a direction corresponding to the direction of movement of the said carriage, a cam member mounted on said shaft for operating the relieving slide, a wedge member for operatively connecting the cam member to the relieving slide, a cam mechanism mounted on the cam shaft and operated in accordance with the direction of rotation of the cam member for moving said wedge to disconnect the cam member from the relieving slide when the carriage is being returned to its initial position.

8. In a relieving mechanism for a lathe, the combination with a cam member, and a relieving slide operated by said cam member and adapted to carry the cutting tool, of a member for connecting the cam member to the slide to effect relieving movements and for moving the cutting tool into and out of operative relation to the work, and means operated according to the direction of rotation of the cam member for moving said connecting member into and out of operative relation to said cam member.

9. In a relieving mechanism for a lathe, the combination with a cam member, and a relieving slide operated by said cam member and adapted to carry the cutting tool, of means for connecting the cam member to the relieving slide to effect relieving movements, and means for operating said connecting means when the cam member is rotated in a reverse direction to stop the relieving movements and withdraw the tool from engagement with the work.

10. In a relieving mechanism, the combination with a cam shaft, a cam member mounted on said shaft, a relieving slide operated by said cam member, and a wedge member for connecting the cam member to the slide, of a cam mechanism operated in accordance with the direction of rotation of the cam member for moving said wedge to disconnect the cam member from said slide when the cam member is rotated in a predetermined direction.

11. In a relieving mechanism, the combination with a cam shaft, a relieving cam member mounted on said shaft, a relieving slide operated by said cam member, and a wedge member for operatively connecting the cam member to the slide, of a cam mechanism mounted on the cam shaft and operated in accordance with the direction of rotation of the cam member for moving said wedge to disconnect the cam member from said slide when the cam member is rotated in a predetermined direction.

In testimony whereof, I hereto affix my signature.

CARL SCHRAMM.